United States Patent
Akasaka et al.

(10) Patent No.: US 9,684,854 B2
(45) Date of Patent: Jun. 20, 2017

(54) PRINT PROCESSOR AND PRINTER TO REDUCE DETERIORATION OF PRINT QUALITY IN LAYERED PRINTING

(71) Applicant: Seiko Epson Corporation, Tokyo (JP)

(72) Inventors: Tatsuo Akasaka, Shiojiri (JP); Satoru Ono, Shiojiri (JP); Hiroyuki Tsuji, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/969,727

(22) Filed: Dec. 15, 2015

(65) Prior Publication Data

US 2016/0182764 A1    Jun. 23, 2016

(30) Foreign Application Priority Data

Dec. 17, 2014    (JP) ................. 2014-255241

(51) Int. Cl.
| | |
|---|---|
| *H04N 1/54* | (2006.01) |
| *G06K 15/02* | (2006.01) |
| *B41J 2/205* | (2006.01) |
| *B41J 2/21* | (2006.01) |

(52) U.S. Cl.
CPC ............ *G06K 15/02* (2013.01); *B41J 2/2054* (2013.01); *B41J 2/2117* (2013.01); *H04N 1/54* (2013.01)

(58) Field of Classification Search
CPC ....... H04N 1/6058; H04N 1/6008; B41J 2/21; G06K 15/02
See application file for complete search history.

(56) References Cited

U.S. PATENT DOCUMENTS

| | | | | |
|---|---|---|---|---|
| 8,223,398 | B2 * | 7/2012 | Watanabe | H04N 1/54 358/1.9 |
| 9,213,924 | B1 * | 12/2015 | Kuo | H04N 1/00 |
| 2007/0216921 | A1 | 9/2007 | Watanabe | |
| 2007/0216924 | A1 | 9/2007 | Watanabe | |
| 2009/0244569 | A1 * | 10/2009 | Watanabe | H04N 1/62 358/1.9 |
| 2010/0253957 | A1 | 10/2010 | Sano et al. | |
| 2011/0181637 | A1 * | 7/2011 | Doggett, III | H04N 1/54 347/5 |
| 2015/0002567 | A1 * | 1/2015 | Miller | B41M 5/0047 347/15 |
| 2015/0029518 | A1 * | 1/2015 | Tashiro | G03G 15/5025 358/1.1 |

FOREIGN PATENT DOCUMENTS

| | | |
|---|---|---|
| JP | 2002-166608 A | 6/2002 |
| JP | 2007-288772 A | 11/2007 |
| JP | 2007-288773 A | 11/2007 |
| JP | 2014-097671 A | 5/2014 |

* cited by examiner

*Primary Examiner* — Barbara Reinier
(74) *Attorney, Agent, or Firm* — Global IP Counselors, LLP

(57) ABSTRACT

A printer includes a control section that generates print data specifying the amount of image forming ink for forming an image and the amount of undercoating ink for forming an undercoat for each pixel on the basis of color information of pixels included in image data. Also, when the amount of the image forming ink to be used is small in each pixel included in the print data, the control section reduces the amount of the undercoating ink to be used to an amount smaller than that of when the amount of the image forming ink to be used is large.

8 Claims, 12 Drawing Sheets

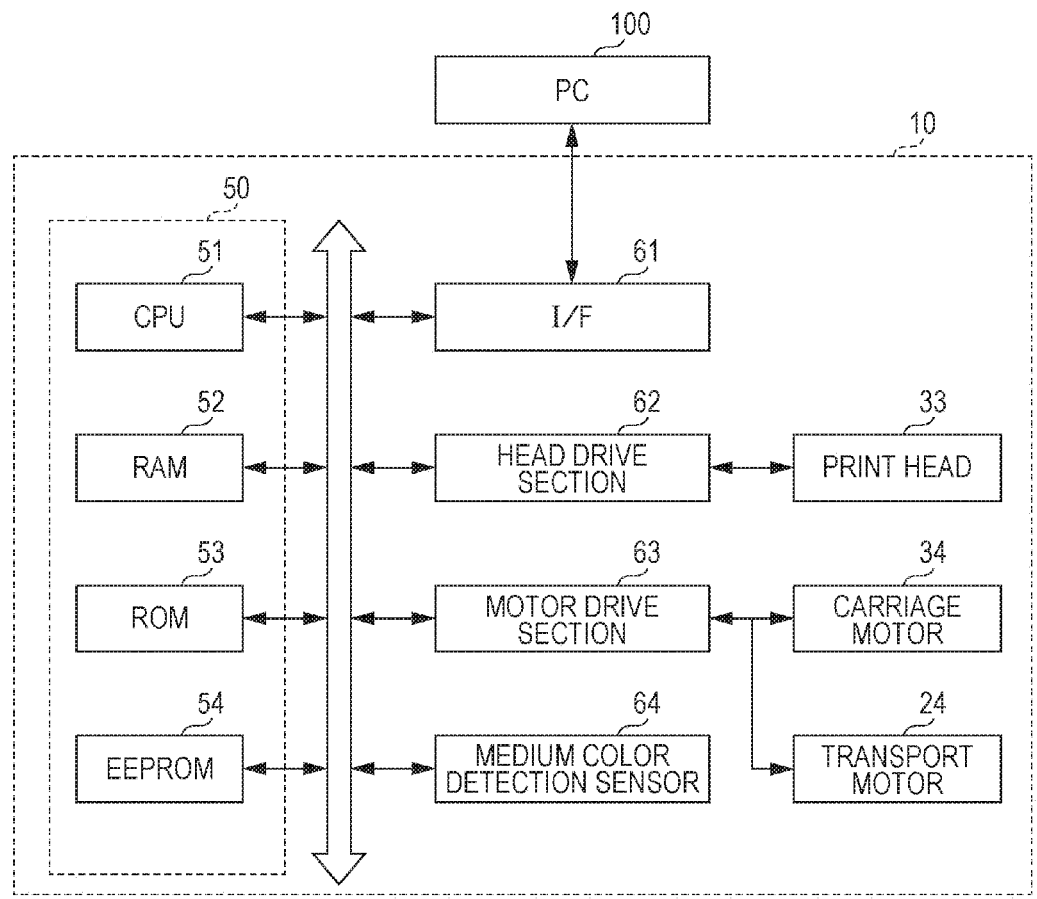

FIG. 4

| ORIGINAL IMAGE DATA | | | CONVERTED IMAGE DATA | | | |
|---|---|---|---|---|---|---|
| R1 | G1 | B1 | R2 | G2 | B2 | A |
| 255 | 255 | 255 | 255 | 255 | 255 | 255 |
| 128 | 128 | 128 | 255 | 255 | 255 | 128 |
| 64 | 64 | 64 | 255 | 255 | 255 | 64 |
| 0 | 0 | 0 | 255 | 255 | 255 | 0 |
| 255 | 128 | 128 | 255 | 128 | 128 | 255 |
| 255 | 64 | 64 | 255 | 64 | 64 | 255 |
| 255 | 0 | 0 | 255 | 0 | 0 | 255 |
| 128 | 0 | 0 | 255 | 0 | 0 | 128 |
| 64 | 0 | 0 | 255 | 0 | 0 | 64 |

FIG. 5

| CONVERTED IMAGE DATA | | | | PRINT DATA | | | | |
|---|---|---|---|---|---|---|---|---|
| R2 | G2 | B2 | A | C | M | Y | K | W |
| 255 | 255 | 255 | 255 | 0 | 0 | 0 | 0 | 255 |
| 128 | 128 | 128 | 255 | 0 | 0 | 0 | 0 | 128 |
| 64 | 64 | 64 | 255 | 0 | 0 | 0 | 0 | 64 |
| 255 | 255 | 255 | 128 | 0 | 0 | 0 | 0 | 128 |
| 255 | 255 | 255 | 64 | 0 | 0 | 0 | 0 | 64 |
| 255 | 255 | 255 | 0 | 0 | 0 | 0 | 0 | 0 |
| 255 | 0 | 0 | 255 | 0 | 255 | 255 | 0 | 255 |
| 255 | 0 | 0 | 128 | 0 | 128 | 128 | 0 | 128 |
| 255 | 0 | 0 | 64 | 0 | 64 | 64 | 0 | 64 |
| 255 | 0 | 0 | 0 | 0 | 0 | 0 | 0 | 0 |

WHITE INK+IMAGE FORMING INK

WHITE INK    WHITE INK+IMAGE FORMING INK
       IMAGE FORMING INK

FIG. 12

| ORIGINAL IMAGE DATA | | | CONVERTED IMAGE DATA | | | |
|---|---|---|---|---|---|---|
| R1 | G1 | B1 | R2 | G2 | B2 | A |
| 255 | 255 | 255 | 255 | 255 | 255 | 255 |
| 192 | 192 | 192 | 171 | 255 | 255 | 192 |
| 128 | 128 | 128 | 0 | 255 | 255 | 128 |
| 64 | 64 | 64 | 0 | 85 | 85 | 192 |
| 0 | 0 | 0 | 0 | 0 | 0 | 255 |
| 255 | 255 | 255 | 255 | 255 | 255 | 255 |
| 255 | 128 | 128 | 255 | 255 | 255 | 128 |
| 255 | 64 | 64 | 255 | 255 | 255 | 64 |
| 255 | 0 | 0 | 0 | 0 | 0 | 0 |
| 128 | 0 | 0 | 0 | 0 | 0 | 128 |
| 64 | 0 | 0 | 0 | 0 | 0 | 192 |

PRINT PROCESSOR AND PRINTER TO REDUCE DETERIORATION OF PRINT QUALITY IN LAYERED PRINTING

BACKGROUND

1. Technical Field

The present invention relates to a print data generation device that generates print data, and a printer including the print data generation device.

2. Related Art

To date, printers that discharge ink (image forming ink) onto a medium, such as a T-shirt, or the like so as to print color images on the medium have been known. Of these printers, some form a color image by using image forming ink on an undercoat formed of undercoating ink in order to print a color image having good color without being affected by medium color, which is the color of a printing surface of the medium (see JP-A-2014-97671, for example).

However, an undercoat formed of undercoating ink on a medium might be visible after printing depending on the amount of image forming ink used when a color image is printed on the undercoat. Accordingly, a visual discrepancy might occur between the image printed on the medium and the original image.

SUMMARY

An advantage of some aspects of the invention is that it provides a print data generation device and a printer that are capable of reducing the visual discrepancy between the image printed on the medium and the original image.

Hereinafter, a technique for solving the above-mentioned problem and an operational effect will be described. According to an aspect of the invention, there is provided a print data generation device that generates print data used for printing on a medium on the basis of image data. The print data generation device includes: a generation section configured to generate print data specifying the amount of image forming ink to be used for forming an image, and an amount of undercoating ink to be used for forming an undercoat for each pixel on the basis of color information of pixels included in the image data. When the amount of the image forming ink to be used is small in each pixel included in the print data, the generation section reduces the amount of the undercoating ink to be used to an amount smaller than that of when the amount of the image forming ink to be used is large.

If an undercoat is formed using a certain amount of undercoating ink regardless of the amount of image forming ink, the undercoat might not be visible when an image is formed on the undercoat in the case where the amount of image forming ink used is large. However, in the case where the amount of image forming ink used is small, the undercoat might be visible when an image is formed on the undercoat. In this case, a visual discrepancy might occur between the image printed on the medium and the original image, which is a result of the undercoat being visible.

With the above-described configuration, the smaller the amount of image forming ink used, the smaller the amount of undercoating ink used. Accordingly, the above-described discrepancy hardly occurs, and thus it is possible to generate print data that hardly causes a visual discrepancy between the image printed on the medium and the original image.

In the above-described print data generation device, it is preferable that the generation section reduces the amount of undercoating ink and the amount of image forming ink specified for a pixel in which the amount of undercoating ink to be used is less than a predetermined amount to be used for each pixel included in the print data to amounts smaller than those of when the amount of undercoating ink and the amount of image forming ink specified for a pixel in which the amount of undercoating ink to be used is less than the predetermined amount to be used.

When printing is performed on a medium on the basis of print data, in a pixel area on the medium having a small amount of undercoating ink, an area in which an undercoat is formed becomes small compared with a pixel area having a large amount of undercoating ink. Accordingly, when a pixel having a small amount of undercoating ink is printed, it becomes difficult to overlap the undercoat with the image forming ink, and thus a pixel printed on the medium (image forming ink) is likely to have poor color.

Thus, in the above-described configuration, in a pixel where the amount of undercoating ink used is less than a predetermined amount in the print data, the amount of undercoating ink used and the amount of image forming ink used, which are specified for the pixel in which the amount of undercoating ink used is less than the predetermined amount are reduced to amounts smaller than the amount of undercoating ink used and the amount of image forming ink used that are specified for the pixel in which the amount of undercoating ink used is less than the predetermined amount. Accordingly, the predetermined amount of undercoating ink to be used is determined to be a value in accordance with the amount of undercoating ink specified for when the color of the printed pixel is poor so that it is possible to generate print data that reduces the amount of undercoating ink and the amount of image forming ink that are used for printing a pixel when color is dull.

In the above-described print data generation device, it is preferable that when the amount of undercoating ink to be used is small for each pixel included in the print data, the generation section increases the amount of image forming ink to be used so as to increase a ratio of the amount of image forming ink to be used to the amount of undercoating ink to be used compared with the ratio of when the amount of undercoating ink to be used is large.

Also, in the above-described configuration, when the amount of undercoating ink used is small, the amount of image forming ink used is increased compared with when the amount of undercoating ink used is large. Accordingly, when the amount of undercoating ink is small, the amount of image forming ink becomes larger compared with the amount of undercoating ink used, and thus the undercoat can easily be overlapped by the image forming ink. Accordingly, even for a pixel in which a small amount of undercoating ink is used, it is possible to generate print data that prevents deterioration of color when a pixel in which a small amount of undercoating ink is used is printed on the medium.

In the above-described print data generation device, it is preferable that when the amount of undercoating ink to be used is small for each pixel included in the print data, the generation section increases the amount of undercoating ink to be used so as to decrease a ratio of the amount of image forming ink to be used to the amount of undercoating ink to be used compared with the ratio of when the amount of undercoating ink to be used is large.

Also, in the above-described configuration, when the amount of undercoating ink used is small, the amount of undercoating ink to be used is increased compared with the case where the amount of undercoating ink to be used is large. Accordingly, when the amount of undercoating ink used is small, the amount of undercoating ink to be used becomes large compared with the amount of image forming ink to be used, and an area on which the undercoat is formed becomes large, and thus it becomes easy for the image forming ink to overlap the undercoat. Accordingly, even for a pixel having a small amount of undercoating ink used, it is possible to generate a print data that makes it possible to prevent deterioration of color when a pixel having a small amount of undercoating ink used is printed on the medium.

In the above-described print data generation device, it is preferable that the undercoating ink is a white ink or a metallic ink.

With the above-described configuration, it is possible to form an undercoat capable of shielding the medium color compared with the case of using the other ink for the undercoating ink. That is, when the image forming ink overlaps the undercoat, it is possible to generate print data capable of improving the color of the image forming ink.

A printer according to another aspect of the invention includes the above-described print data generation device, and a printing section configured to perform printing on the medium on the basis of the print data.

With the above-described configuration, it is possible to obtain the advantages of the above-described print data generation device.

BRIEF DESCRIPTION OF THE DRAWINGS

The invention will be described with reference to the accompanying drawings, wherein like numbers reference like elements.

FIG. 2 is a block diagram illustrating an electrical configuration of a printer according to the first embodiment.

FIG. 3 is a schematic diagram illustrating a relationship among the RGB values of an original image, a converted image, and a medium.

FIG. 4 is a table for converting RGB-format image data into RGBA-format image data in the first embodiment.

FIG. 5 is a table for converting RGBA-format image data into CMYKW-format print data.

FIG. 6A illustrates the case where the amounts of white ink used and image forming ink used are large. FIG. 6B illustrates the case where the amounts of white ink and image forming ink are small.

FIG. 12 is a table for converting RGB-format image data into RGBA-format image data in a second embodiment.

DESCRIPTION OF EXEMPLARY EMBODIMENTS

First Embodiment

Following, a description will be given of a printer according to a first embodiment with reference to the drawings. In this regard, in the present embodiment, it is assumed that the printer is an ink jet printer that performs printing on a medium by discharging ink onto the medium.

Figure 1:
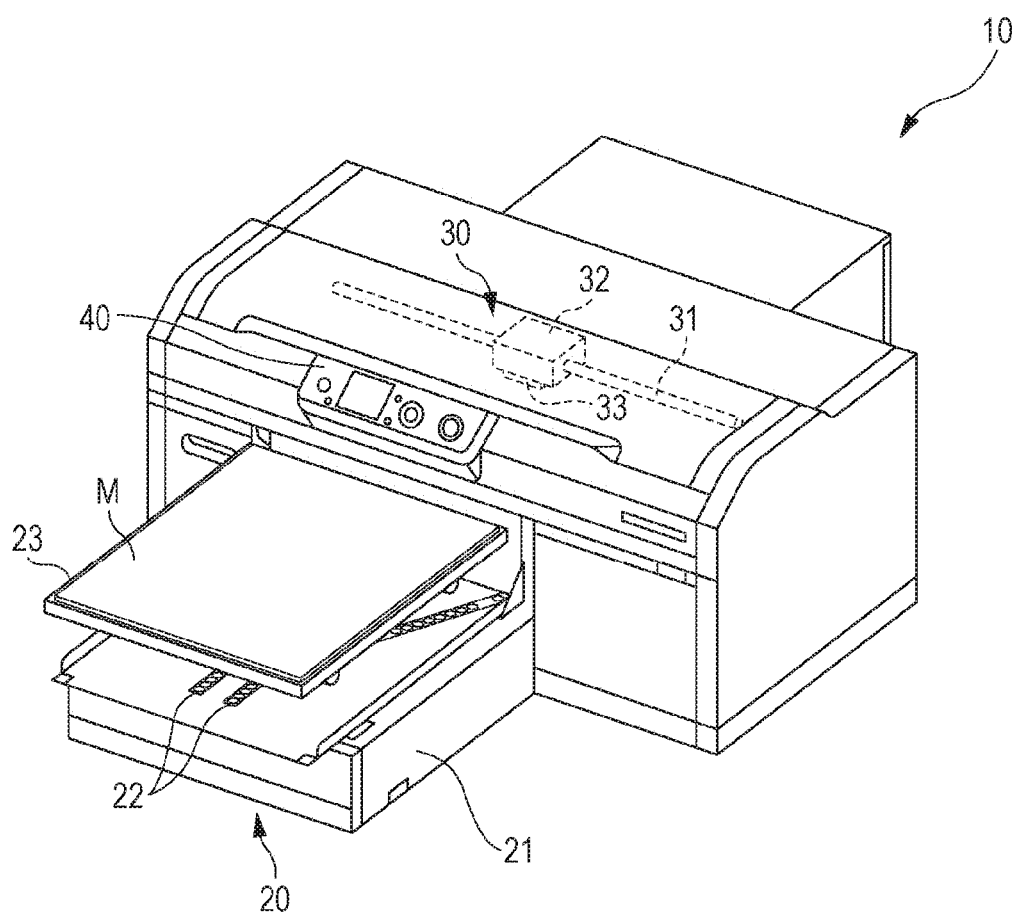
FIG. 1 is a perspective view of a printer according to a first embodiment.

As illustrated in FIG. 1, a printer 10 includes a transport section 20 that transports a medium M, such as a T-shirt, or the like, a printing section 30 that performs printing on the medium M that has been transported by the transport section 20, and an operation section 40 that operates the printer 10.

The transport section 20 includes a base section 21 that protrudes in the transport direction of the medium M from the main body of the printer 10, a transport rail 22 extending in the transport direction of the medium M on the upper surface of the base section 21. Also, the transport section 20 includes a medium support section 23 supporting the medium M, and a transport motor 24 (see FIG. 2) as a drive source when the medium support section 23 is moved along the transport rail 22 in the longitudinal direction of the base section 21.

The printing section 30 includes a guide shaft 31 extending in a direction crossing the transport direction of the medium M, a carriage 32 supported slidably with the guide shaft 31, a print head 33 held by the carriage 32, and a carriage motor 34 (see FIG. 2) that becomes a drive source when the carriage 32 is reciprocated in the longitudinal direction of the guide shaft 31.

The print head 33 discharges cyan ink, magenta ink, yellow ink, and black ink, which are examples of image forming ink, and white ink, which is an example of undercoating ink onto the medium M so as to perform printing on the medium M. That is, in the printer 10 according to the present embodiment, in order to improve the color developing property of the image forming ink discharged onto the medium regardless of the medium color, which is the color of the printing surface of the medium M, an undercoat is formed on the medium M by light-shielding ink, and an image is formed on the undercoat by the image forming ink. Following, a description will be given of a case where white ink is used as light-shielding ink. In this regard, when white ink is used in order to form a white image, the white ink corresponds to an example of the image forming ink. Also, "image" in this specification includes characters, figures, symbols, and the like.

Next, a description will be given of the electrical configuration of the printer 10 with reference to FIG. 2. As illustrated in FIG. 2, the printer 10 includes a control section 50 including a CPU 51 (central processing unit), a RAM 52, a ROM 53, and an EEPROM 54, and an I/F 61 for connecting the printer 10 to a PC 100. The RAM 52 stores temporary data, the ROM 53 stores various control programs executed by the CPU 51, various tables, and the like, and the EEPROM 54 stores data that changes with time.

Also, the printer 10 includes a head drive section 62 for driving the print head 33, a motor drive section 63 for driving the carriage motor 34 and the transport motor 24, and a medium color detection sensor 64 for measuring medium color. Then in the printer 10, the CPU 51, the RAM 52, the ROM 53, the EEPROM 54, the I/F 61, the head drive section 62, the motor drive section 63, and the medium color detection sensor 64 are connected via a bus.

In this manner, the control section 50 generates print data on the basis of input of a control signal and image data from the PC 100, and input of a detection signal from the medium color detection sensor 64. Then the control section 50 controls driving of the head drive section 62 and the motor drive section 63 on the basis of the generated print data and causes the print head 33 to discharge ink toward the medium M. At this point, in this embodiment, the control section 50 corresponds to a "print data generation device that generates print data used for printing on a medium on the basis of image data".

Next, a description will be given of the contents of the image data and the print data that are handled by the control section 50.

In this embodiment, the control section 50 converts the RGB-format image data input from the PC 100 into RGBA-format image data and then converts the RGBA-format image data into CMYKW-format print data. Accordingly, when the printer 10 prints an image, the control section 50 handles the RGB-format image data, the RGBA-format image data, and the CMYKW-format print data.

Here, RGB-format image data includes an R value which is a grayscale value in accordance with the intensity of a red component, a G value which is a grayscale value in accordance with the intensity of a green component, and a B value which is a grayscale value in accordance with the intensity of a blue component for each pixel forming an image, and represents color with the RGB values. Also, the RGBA-format image data includes an A value which is a grayscale value in accordance with the transparency value of the pixel in addition to an R value which is a grayscale value in accordance with the intensity of a red component, a G value which is a grayscale value in accordance with the intensity of a green component, and a B value which is a grayscale value in accordance with the intensity of a blue component for each pixel forming an image, and represents color with the RGBA values. In this regard, in the RGBA-format image data, the higher the transparency value of a pixel, the more opaque the pixel, and the lower the transparency value of a pixel, the more transparent the pixel.

The CMYKW-format print data includes a C value which is a grayscale value in accordance with the amount (the discharge amount) of cyan ink used, an M value which is a grayscale value in accordance with the amount of magenta ink used, and a Y value which is a grayscale value in accordance with the amount of yellow ink used, a K value which is a grayscale value in accordance with the amount of black ink used, and a W value which is a grayscale value in accordance with the amount of white ink used for each pixel included in an image. Then the CMYKW-format print data represents color with the CMYKW values.

In this regard, in the following description, for the sake of easy understanding, it is assumed that RGB-format image data, RGBA-format image data, and CMYKW-format image data are data representing 256 grayscale values. Accordingly, in RGBA-format image data, if the transparency (A value) is "0" (zero), the pixel is expressed as a fully transparent pixel, whereas if the transparency (A value) is "255", the pixel is expressed as a fully opaque pixel. Also, in CMYKW-format print data, if each grayscale value (C value, M value, Y value, K value, and W value) is "0 (zero)", ink of the corresponding color is not discharged at the time of printing the pixel, whereas if each grayscale value (C value, M value, Y value, K value, and W value) is "255", ink of the corresponding color is discharged at the maximum quantity at the time of printing the pixel.

Next, a description will be given of the relationship between the medium color and the amount of image forming ink used at the time of printing an image.

In order to reduce the amount of image forming ink used when printing an image on the medium M, it is thought that a pixel having the same RGB values as those of the medium color will not be printed among the pixels included in the image data, for example. However, in this case, the amount of ink used for printing a pixel having RGB values close to those of the medium color among the pixels included in the image data does not change.

Also, one way to reduce the amount of image forming ink used is to not print, for example, a pixel having RGB values that are close to the RGB values of the medium color among the pixels included in the image data based on the result of comparing the RGB values of the pixels included in the image data and the predetermined threshold values. However, in this case, the pixels that are assumed to have different RGB values in the image data are not printed uniformly, and thus a visual discrepancy might occur between the image to be printed and the image printed on the medium M. That is, deterioration in print quality might occur.

Thus, in this embodiment, in order to prevent a deterioration of print quality while reducing the amount of image forming ink used for printing, print data is generated on the basis of the image data produced by subtracting the color information of the medium color from the color information of the pixels included in the image data, and printing is performed on the medium M in accordance with the print data. More specifically, print data is generated on the basis of the RGBA-format image data in which the color components (RGB values) of the medium color are subtracted from the color components (RGB values) of the pixels included in the RGB-format image data, and the lower transparency (A value) is set for a pixel having the larger amount of reduction. Thereby, among the pixels included in the RGB-format image data, the closer the color of a pixel to the medium color, the more transparent the pixel, and printing is performed such that the medium color is transparent.

Next, a description will be given of a method of converting RGB-format image data into RGBA-format image data in accordance with the medium color with reference to FIG. 3. In this regard, in the following description, an RGB-format image is also called an "original image", and an RGBA-format image is called a "converted image".

As described above, in this embodiment, in order to reduce the amount of image forming ink to be used for printing, among the pixels included in the RGB-format image data, RGBA-format image data whose color components of the medium color have been subtracted from the pixels including the color components of the medium color is generated. Accordingly, as illustrated in FIG. 3, it is desired that a visual image (RGB values) in a state in which an RGBA-format image Im2 overlaps the medium M matches a visual image (RGB values) of an RGB-format image Im1.

Accordingly, assuming that the RGB values of a pixel included in the original image data are (R1, G1, B1), the RGBA values of the pixel included in the converted image data are (R2, G2, B2, A), and the RGB values of the medium color are (R3, G3, B3), it is possible to obtain the relational expressions presented below.

$$R1 = R2 \cdot (A/255) + R3 \cdot (1-(A/255)) \quad \text{(Expression 1)}$$

$$G1 = G2 \cdot (A/255) + G3 \cdot (1-(A/255)) \quad \text{(Expression 2)}$$

$$B1 = B2 \cdot (A/255) + B3 \cdot (1-(A/255)) \quad \text{(Expression 3)}$$

Here, in (Expression 1) to (Expression 3), the first term on the left side represents the R value, the G value, or the B value of a pixel included in the original image, the first term on the right side represents the R value, the G value, or the B value of a pixel included in the converted image data in consideration of transparency, and the second term on the right side represents the R value, the G value, or the B value of the medium color in the converted image data in consideration of transparency. Subsequently, the RGBA values of the converted image data must be image data having RGBA values that satisfy (Expression 1) to (Expression 3).

In the following description of the first embodiment, the case where an image is printed on a medium M whose medium color is black is described. That is, it is assumed that the RGB values (R3, G3, B3) of the medium color are (0, 0, 0). In this case, (Expression 1) to (Expression 3) become (Expression 4) to (Expression 6) presented below.

$$R1 = R2 \cdot (A/255) \quad \text{(Expression 4)}$$

$$G1 = G2 \cdot (A/255) \quad \text{(Expression 5)}$$

$$B1 = B2 \cdot (A/255) \quad \text{(Expression 6)}$$

Here, in order to reduce the amount of ink to be used for printing an image, it is desirable to lower the A value in the converted image data such that the medium color (black) is as transparent as possible when the image is printed on the medium M. However, it is sometimes not possible to lower the A value depending on the RGB values of the pixel included in the original image data.

In (Expression 4), the R1 value is a value produced by multiplying the product of the R2 value and the A value by a constant (1/255), and thus there are a plurality of combinations of the R2 value and the A value in order to produce a predetermined R1 value. Note that assuming the upper limit value of the R2 value is "255", it is easy to make the A value low. Then when the R2 value is handled as a constant having the upper limit value of "255", the A value is assumed to be proportional to the R1 value. Accordingly, when the R1 value is high, unless the A value is increased so that the medium color is not transparent, the R value of when the converted image overlaps the medium M becomes less than the R1 value of the original image. Accordingly, the higher the R1 value, the higher the A value needs to become. In the same manner, the higher the G1 value, the higher the A value needs to be increased, and the higher the B1 value, the higher the A value needs to become. The higher the R1 value, the G1 value, and the B1, the higher the A value needs to become, and thus it is possible to obtain the following expression.

$$A = \max(R1, G1, B1) \quad \text{(Expression 7)}$$

In this manner, in accordance with (Expression 4) to (Expression 7), the RGBA values (R2, G2, B2, A) of a pixel included in the converted image data are uniquely determined in accordance with the RGB values (R1, G1, B1) of a pixel included in the original image data, and thus it is possible to convert the RGB-format original image data into the RGBA-format image data in accordance with the medium color.

As illustrated in FIG. 4, a first conversion table (first look-up table) for converting the RGB values of a pixel included in the original image data into RGBA values on the basis of (Expression 4) to (Expression 7) is created. In this regard, the first conversion table is stored in the ROM 53 so as to be referenced by the control section 50 at the time of image data conversion.

Here, by the first conversion table illustrated in FIG. 4, the RGB values (R2, G2, B2) of the converted image data are equal to or higher than the RGB values (R1, G1, B1) of the original image data. Accordingly, with the first conversion table, brightness is increased by the conversion, and thus it is said that a black color component, which is the medium color, decreases.

Also, in accordance with a typical expression that converts the RGB format into the CMYK format, a "K value", which is the black color component, is expressed as K=min (255−R, 255−G, 255−B). Then the RGB values (R1, G1, B1) of the original image data and the RGB values (R2, G2, B2) of the converted image data are assigned to the above expression, and the K values of before and after the conversion are compared. The K value of the converted image data becomes less than or equal to the K value of the original image data. Accordingly, from this point, the black color component, which is the medium color, is also decreased by the conversion.

Further, the larger the increase in the R value, the G value, or the B value from the RGB values of the original image data to the RGB values of the converted image data, the lower the A value. Also, the larger the decrease in the above-described K value by the conversion, in other words, the larger the decrease in the black color component, which is the medium color, the lower the A value.

Next, a description will be given of a relationship between the transparency (A value) of the converted image data, the amount (W value) of white ink to be used in the print data, and the amount (CMYK value) of the image forming ink to be used.

As described above, in this embodiment, in order to produce good color in an image printed on the medium M regardless of the medium color, an image is formed by the image forming ink on an undercoat formed by white ink. That is, the undercoat is formed so that the image forming ink produces good color, and thus it is desired that the undercoat is not visible when the printed medium is viewed.

Here, when a pixel for which transparency is set is printed among the pixels included in the RGBA-format image data, it is necessary that the medium color on which the pixel is printed is transparent, and at the same time, it is necessary that the undercoat formed by white ink is not visible when the pixel is printed.

Thus, in this embodiment, the lower the transparency value of a pixel in the RGBA-format image data, the smaller the amount of white ink applied when the pixel is printed. That is, when the RGBA-format image data is converted into the CMYKW-format print data, the smaller the A value set for a pixel, the lower the W value set for the pixel.

Also, when the amount of image forming ink to be used in the print data is small, an impact area of the image forming ink on the medium M is likely to be small compared with the case where the amount of image forming ink to be used is large. That is, when the amount of the white ink that forms an undercoat is kept at a constant value regardless of the amount of image forming ink used, the smaller the amount of image forming ink used, the larger the area of the undercoat on which the image forming ink does not impact, and thus the undercoat might be visible when viewing the medium M after printing.

Thus, in this embodiment, when the amount of image forming ink to be used is small, the amount of the undercoating ink to be used is made smaller than in the case where the amount of image forming ink to be used is large. That is, when the RGBA-format image data is converted into the CMYKW-format print data, the lower the CMYK value of a pixel, the lower the W value of the pixel assigned.

In this manner, as illustrated in FIG. 5, a second conversion table (second look-up table) that converts the RGBA values of the pixels included in the converted image data into CMYKW values is created. That is, as illustrated in FIG. 5, in accordance with the second conversion table, the smaller the A value in the converted image, the smaller the W value of the print data assigned. When the CMYK value of the print data is higher than "0 (zero)", the lower the CMYK value of the print data, the lower the W value assigned. In this regard, the second conversion table is stored in the ROM 53 so as to be referenced by the control section 50 at the time of generating the print data.

Figure 6A:
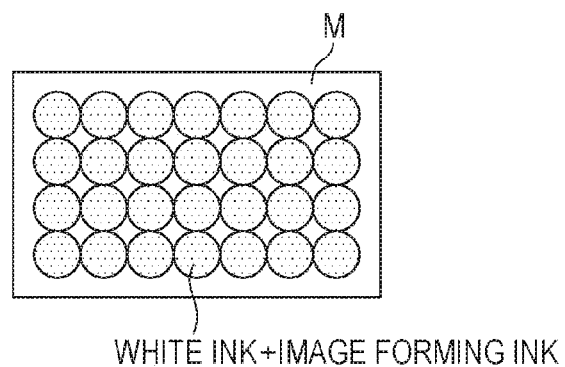
FIGS. 6A and 6B are schematic diagrams illustrating landing positions of white ink and image forming ink on the printing surface of a medium when printing is performed on the basis of print data.

Next, with reference to FIGS. 6A and 6B, a description will be given of color development and a relationship between the amount of white ink used and the amount of image forming ink used. As illustrated in FIG. 6A, when an image is formed by the image forming ink on a undercoat formed by the white ink, if printing of a pixel having a large amount of white ink is performed, the area on which the undercoat is formed by the white ink is large, and it becomes easy for the image forming ink to be placed on the undercoat formed by the white ink. Accordingly, it is difficult for the pixel (image forming ink) printed on the medium M to have poor color.

Figure 6B:
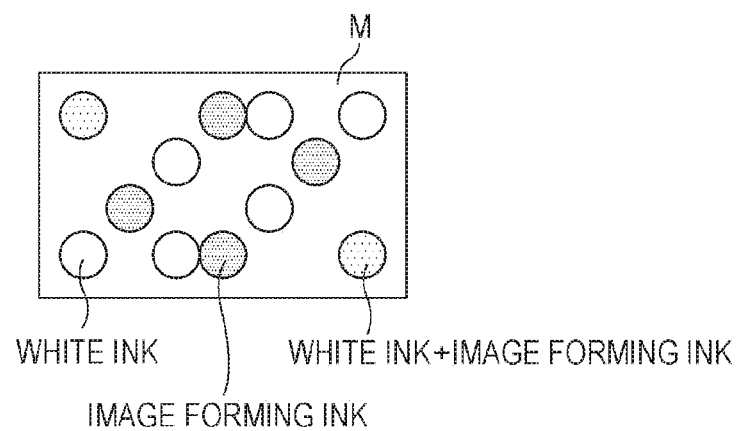

On the other hand, as illustrated in FIG. 6B, when a pixel having a small amount of the white ink is printed, an area on which an undercoat is formed by the white ink is small, and thus it is difficult for the image forming ink to be impacted on the undercoat formed by the white ink. Accordingly, the image forming ink might be impacted on the medium M where the undercoat is not formed, or an undercoat portion where the image forming ink is not impacted might remain, and thus the color of the pixel (image forming ink) printed on the medium M is apt to be deteriorated.

In this regard, in the following description, the amount of the white ink assigned to a pixel when the color deteriorates among the pixels printed on the medium M is also called a "predetermined amount". The predetermined amount ought to be determined, for example on the basis of the color map created by printing a plurality of pixels arranged in a manner of gradually reducing the amounts of the white ink used and the image forming ink used, and the sensory evaluation by a human visual sense or the medium color detection sensor 64.

Also, in FIGS. 6A and 6B, a description has been given of the case where an image is formed by the image forming ink on an undercoat formed by the white ink, that is, the case of using the white ink as the undercoating ink. However, when the white ink is used as the image forming ink, the smaller the amount of the white ink used, the worse becomes the color of the pixel printed on the medium M. In the following description, in this case, the amount of the white ink is also called a "predetermined amount".

Then in this embodiment, in each pixel included in the print data, in a pixel having the amount of white ink (undercoating ink) to be used less than a predetermined amount in print data, the amount of white ink to be used and the amount of image forming ink to be used that are specified for the pixel having the amount of white ink less than the predetermined amount are reduced to smaller amounts than the amount of white ink to be used and the amount of image forming ink to be used that are specified for the pixel having the amount of white ink less than the predetermined amount. That is, when the pixels included in the print data includes a pixel having the grayscale value (W value) of the white ink and the grayscale values (C value, M value, Y value, and K value) of the image forming ink that are less than a first grayscale value Lth1 according to a predetermined amount to be used, the grayscale value of the white ink and the grayscale value of the image forming ink of the pixel having the grayscale value of the white ink and the grayscale value of the image forming ink that are less than the first grayscale value Lth1 according to the predetermined amount to be used are decreased.

Next, a description will be given of a map for decreasing the grayscale value of the white ink and the grayscale value of the image forming ink with reference to FIG. 7.

Figure 7:
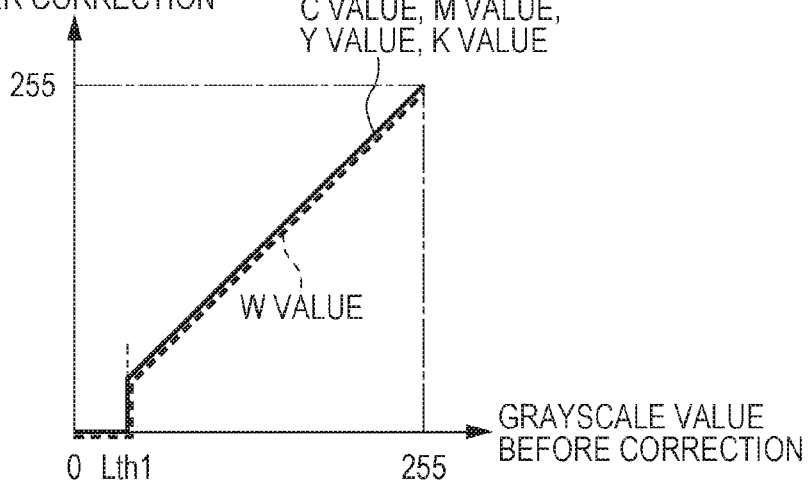
FIG. 7 is a map for correcting the amounts of white ink to be used and image forming ink to be used.

The map illustrated in FIG. 7 is a map that corrects the grayscale value (W value) of the white ink, and the grayscale values (C value, M value, Y value, and K value) of the image forming ink. That is, when the grayscale value of the white ink and the grayscale value of the image forming ink before the correction is not less than the first grayscale value Lth1, the grayscale value of the white ink and the grayscale value of the image forming ink after the correction are determined to be the same as the original grayscale values. Also, when the grayscale value of the white ink and the grayscale value of the image forming ink before the correction are less than the first grayscale value Lth1, the grayscale value of the white ink and the grayscale value of the image forming ink after the correction are determined to be "0 (zero)". In this regard, it is desired that the first grayscale value Lth1 is a grayscale value up to "85", which corresponds to one third of the values from "1" to 256 grayscales, for example.

Figure 8:
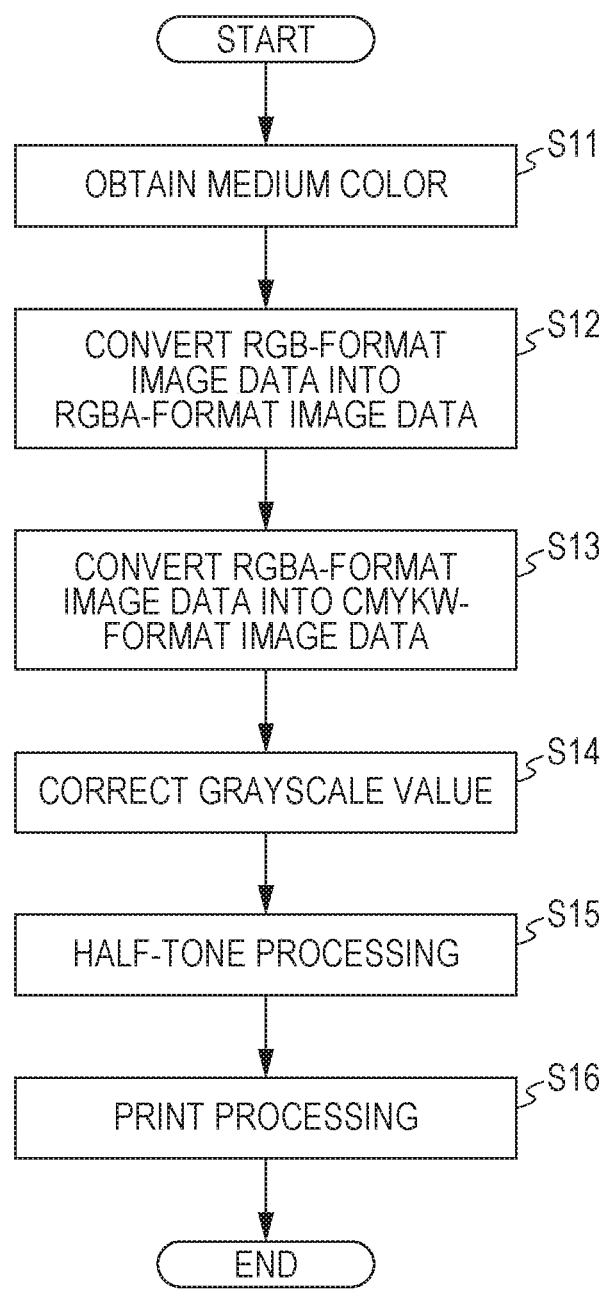
FIG. 8 is a flowchart illustrating a processing routine executed by a control section in order to perform printing on a medium on the basis of image data.

Next, a description will be given of the processing routine executed by the control section 50 of the printer 10 for printing the medium M on the basis of the image data with reference to a flowchart illustrated in FIG. 8. As illustrated in FIG. 8, the control section 50 obtains the medium color on the basis of the detection signal of the medium color detection sensor 64 (step S11). Next, the control section 50 converts the RGB-format image data into RGBA-format image data on the basis of the obtained medium color (step S12). That is, if the medium color is black, the first conversion table illustrated in FIG. 4 is referenced, and the RGB values of the pixels included in the original image data are converted into RGBA values by the first conversion table. On this point, in this embodiment, the control section 50 corresponds to "the processing section that performs subtraction processing for reducing color information of the medium color from the color information of the pixels included in the image data", for example.

Then the control section 50 converts the RGBA-format image data into CMYKW-format print data (step S13). That is, the RGBA values of the pixels included in the image data after the conversion are converted into the CMYKW values by the second conversion table illustrated in FIG. 5. On this point, in this embodiment, the control section 50 corresponds to "the generation section that generates the print data specifying the amount of image forming ink to be used for each pixel on the basis of the image data after the subtraction processing", for example.

Next, the control section 50 corrects the CMYKW values of the pixels included in the print data with reference to the correction map illustrated in FIG. 7 (step S14). Then control section 50 performs half-tone processing on the print data (step S15), and performs print processing (step S16). When the print processing is performed, the print head 33 discharges white ink and image forming ink onto the medium M, and the undercoat and the image are formed on the medium M. Then after the undercoat and the image are formed, the control section 50 terminates the processing.

Next, a description will be given of action of the printer 10 with reference to FIG. 9 to FIG. 11. More specifically, a description will be given of changes in the RGB values and the CMYKW values when printing an image having gradation from white to black through red onto the medium M having black medium color.

Figure 10:
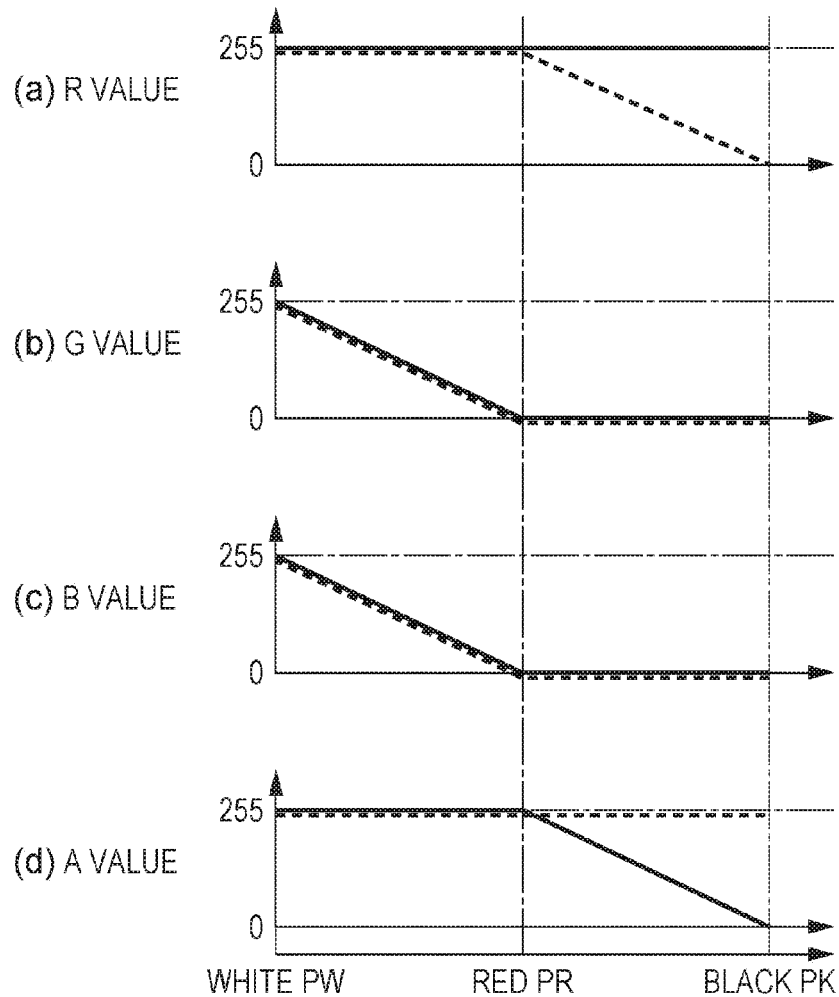
FIG. 10 is a graph illustrating changes in RGBA values with respect to a change in gradation.
Figure 11:
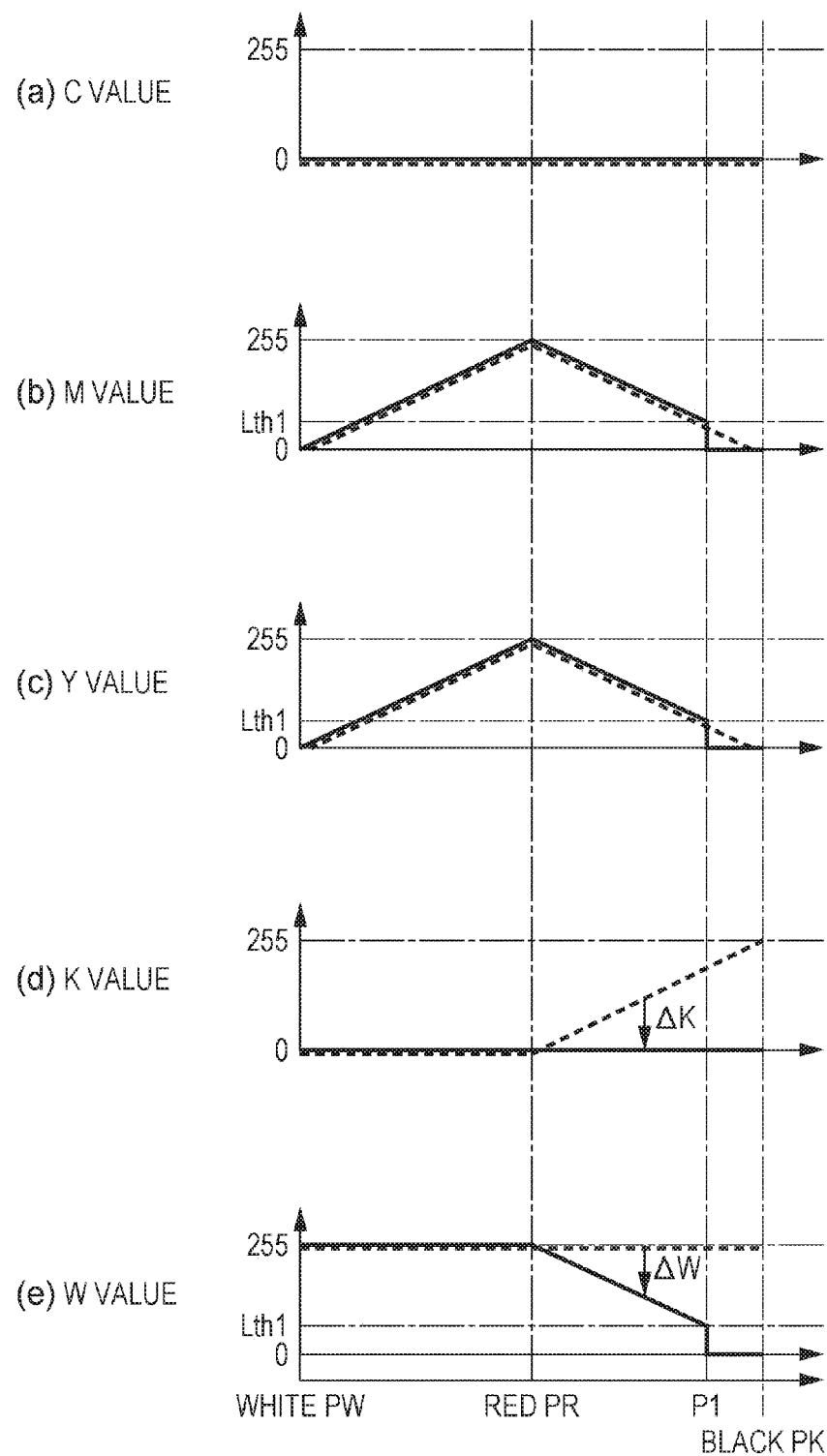
FIG. 11 is a graph illustrating changes in CMYKW values with respect to a change in gradation.

In this regard, in FIG. 10 and FIG. 11, the changes in the case of this embodiment are illustrated by solid lines, and the changes in the case of converting the RGB values directly into the CMYKW values without converting the RGB values to the RGBA values are illustrated by broken lines as a comparative example. That is, the image data in the comparative example has a transparency value that is always opaque (A value="255"), and is said to be the original image data in a relationship with the converted image data.

Figure 9:
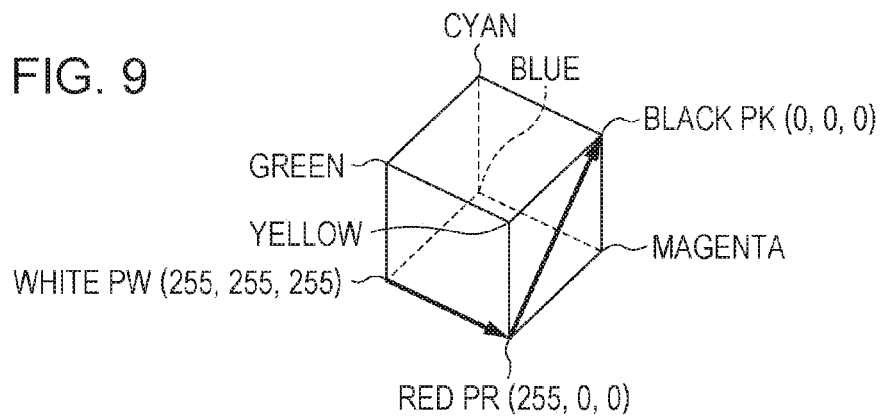
FIG. 9 is a schematic diagram illustrating a gradation forming direction.

As illustrated in FIG. 9, when an image having the gradation from white PW to black PK through red PR is printed, as illustrated in FIG. 10, the RGBA values change in the gradation forming direction (horizontal axis).

In the case of the comparative example, which is the case of the original image data, the R value and the A value are kept at "255" in a section from white PW to red PR, whereas the G value and the B value gradually decrease from "255" to "0 (zero)" when the gradation changes from white PW to red PR. Then when the gradation changes from red PR to black PK, the G value and the B value are kept at "0 (zero)", and the A value is kept at "255". Also, the R value gradually decreases from "255" to "0 (zero)" when the gradation changes from red PR to black PK in a section from red PR to black PK.

In contrast, in the case of this embodiment, the R value and the A value are kept at "255" in a section from white PW to red PR, whereas the G value and the B value gradually decrease from "255" to "0 (zero)" when the gradation changes from white PW to red PR. Accordingly, the RGB values change in the same manner in a section from white PW to red PR in the case of this embodiment and in the case of the comparative example.

Then from red PR to black PK, the R value is kept at "255", and the G value and the B value are kept at "0 (zero)". Also, the A value gradually decreases from "255" to "0 (zero)" when the gradation changes from red PR to black PK. In this manner, in the case of this embodiment, the A value of the image data is decreased such that the medium color, which is black, gradually becomes transparent when the gradation changes from red PR to black PK.

Then as illustrated in FIG. 9, when an image having the gradation from white PW to black PK through red PR is printed, the CMYKW values changes as illustrated in FIG. 11 with respect to the gradation forming direction (horizontal axis). Here, the CMYKW values are the grayscale values corresponding to the amount of ink used, and thus the lower the CMYKW values, the smaller amount of ink is necessary to be used in order to print an image.

In the case of the comparative example, the C value and the K value are kept at "0", and the W value is kept at "255" from white PW to red PR. Also, the M value and the Y value gradually increase from "0 (zero)" to "255" when the gradation changes from white PW to red PR. Then the C value is kept at "0", and the W value is kept at "255" from red PR to black PK. Also, the M value and the Y value gradually decrease from "255" to "0 (zero)", and the K value gradually increases from "0 (zero)" to "255" when the gradation changes from red PR to black PK.

In contrast, in the case of this embodiment, the C value and the K value are kept at "0" from white PW to red PR, and the W value is kept at "255". Also, the M value and the Y value gradually increase from "0 (zero)" to "255" when the gradation changes from white PW to red PR. Accordingly, the CMYKW values change in the same manner in a section from white PW to red PR in the case of this embodiment and in the case of the comparative example.

Then the C value and the K value are kept at "0", the M value, the Y value, and the W value gradually decrease from "255" to "0 (zero)" when the gradation changes from red PR to black PK. Here, the M value, the Y value, and the W value are assumed to be "0 (zero)" at P1 at the time of becoming the first grayscale value Lth1, and are kept at "0 (zero)" after that.

In this manner, as illustrated in parts (b) and (c) of FIG. 11, the amounts of the magenta ink used and the yellow ink used are substantially equal in the case of this embodiment and in the case of the comparative example. However, as illustrated in parts (d) and (e) of FIG. 11, the amounts of the black ink used and the white ink used become smaller in the case of this embodiment than in the case of the comparative example. Accordingly, with this embodiment, the amount of the black ink used, which is the same color as the medium color of the medium M on which printing is performed, and the amount of the white ink used for forming the undercoat are reduced.

Here, as illustrated in parts (d) and (e) of FIG. 11, the difference when the amount of black ink used in this embodiment is subtracted from the amount of black ink in the comparative example is assumed to be "the amount of decrease $\Delta K$ in black ink", and the difference when the amount of white ink used in this embodiment is subtracted from the amount of white ink in the comparative example is assumed to be "the amount of decrease $\Delta W$ in white ink".

Then, from white PW to black PK, there is a case where the amount of decrease $\Delta K$ in black ink becomes "0 (zero)" or more, and thus the amount (K value) of ink to be used corresponding to the medium color (black) in this embodiment is less than the amount (K value) of ink to be used corresponding to the medium color (black) in the comparative example.

Also, the amount of decrease $\Delta K$ in black ink becomes maximum in the case of black PK. On this point, the amount of decrease ($\Delta K$) in ink use corresponding to the medium color (black) becomes maximum at the time of printing the medium color (black).

Further, the amount of decrease $\Delta K$ in black ink gradually becomes larger when the gradation changes from red PR to black PK. That is, the amount of decrease $\Delta K$ in black ink becomes larger when color similar to the medium color (black) is printed. For example, in the RGB cube illustrated in FIG. 9, when printing a color in the shorter distance from black PK, the larger becomes the amount of decrease $\Delta K$ in black ink. On this point, the amount (K value) of ink to be used is reduced in accordance with a change in color density on the basis of the medium color (black).

On the other hand, the amount of decrease ΔW of white ink becomes larger as the amount of decrease ΔK of black ink becomes larger.

Also, as illustrated in parts (b), (c), and (e) of FIG. 11 in this embodiment, when the W value becomes less than the first grayscale value Lth1, the M value, the Y value, and the W value are corrected to "0 (zero)", and thus magenta ink, yellow ink, and white ink become unused (undischarged). Accordingly, magenta ink, yellow ink, and white ink become unused for printing a part that is poorly colored among the image printed on the medium M. Also, a pixel having low M value, Y value, and W value becomes not printed, and thus the contrast of the printed image becomes high.

With the embodiment described above, it is possible to obtain the advantages described below.

(1) Printing is performed by the print data produced on the basis of the image data from which the color information of the medium color is reduced from the color information of the pixels included in image data, so that it is possible to reduce the amount of image forming ink to be used by the amount of reduction of the color information of the medium color from the original image data. Also, in a state in which an image is printed on the medium M, the color information subtracted from the image data is corrected by the color information of the medium color of the medium M on which the image is printed, and thus it is possible to prevent a visual discrepancy with the original image. Accordingly, with this embodiment, it becomes possible to reduce amount of image forming ink to be used in accordance with the medium color.

(2) When the RGB-format image data is converted into the RGBA-format image data, the larger amount of decrease in the color information of the medium color a pixel has, the lower the transparency (A value) is given to the pixel, and the lower transparency value a pixel has among the pixels included in the RGBA-format image data, printing is performed such that the more the medium color can be seen through. In this manner, a difference is made in the degree of transparency of the pixels included in the RGBA-format image data, and a difference is given to the transparent state of the medium color, and thus it is possible to perform printing by taking advantage of the medium color.

(3) The lower the transparency (A value) of a pixel in the RGBA-format image data, the smaller the amount of white ink is used when the pixel is printed, and thus the medium color is prevented from not being seen by the undercoat. Accordingly, it is possible to perform printing by taking advantage of the medium color even in the case of forming an image on the undercoat.

(4) The smaller the amount of image forming ink used, the smaller amount of white ink is used, and thus when an image is formed on the undercoat, an undercoat having no impact of image forming ink is prevented from being seen. Accordingly, it is possible to prevent the occurrence of a visual discrepancy between the image printed on the medium, and the original image.

(5) For a pixel having the grayscale value of white ink less than the first grayscale value Lth1 in print data, the amount of the white ink to be used and the amount of image forming ink to be used are set to "0 (zero)". Accordingly, it is possible to reduce the amounts of the white ink used and the image forming ink that are used for printing a poorly-colored part among the image printed on the medium M.

(6) White ink is used as undercoating ink, and thus it is possible to form an undercoat capable of shielding the medium color compared with the case of substituting the other color ink for the white ink. That is, when the image forming ink is discharged onto such an undercoat, it is possible to improve the color development of the image forming ink.

(7) In general, white ink has a large particle diameter of pigment particles compared with image forming ink, and the content rate of the pigment particles is high. Accordingly, assuming that the discharge amount of ink per a unit area on the medium M is the same, the solid components remaining on the printed medium M becomes larger in the case of white ink than in the case of the image forming ink. Also, in the printed medium M, an undercoat layer formed by white ink becomes thicker than an image layer formed by the image forming ink. Accordingly, the larger the amount of white ink used for printing, the worse the hand feeling is apt to become when the printed medium M is touched by hand. On this point, with the above-described embodiment, the amount of white ink to be used is reduced as the amount of image forming ink to be used is decreased. Accordingly, it is possible to prevent deterioration of hand feeling on the printed medium M.

Second Embodiment

In the following, a description will be given of a printer 10 according to a second embodiment with reference to the drawings. In this regard, in the second embodiment, the same symbol is given to a member having a common configuration as that in first embodiment, or the like, and thus the description will be simplified or omitted.

In the second embodiment, a description will be given of the case of printing an image having a medium color of red on the medium M differently from the first embodiment in which an image is printed on the medium M having a medium color of black. That is, it is assumed that the RGB values (R3, G3, B3) of the medium color are (255, 0, 0). Then in this case, (Expression 1) to (Expression 3) become (Expression 8) to (Expression 10) illustrated below.

$$R1 = R2 \cdot (A/255) + 255 \cdot (1-(A/255)) \quad \text{(Expression 8)}$$

$$G1 = G2 \cdot (A/255) \quad \text{(Expression 9)}$$

$$B1 = B2 \cdot (A/255) \quad \text{(Expression 10)}$$

Here, in order to reduce the amount of ink to be used for printing an image, it is desired that the A value in the converted image data becomes low so that the medium color (red) is seen as much as possible when the image is printed on the medium M. However, there are cases where the A value is difficult to become low depending on the RGB values of the pixels included in the original image data.

First, a description will be given of a relationship between the R value, which is the same as the medium color, and the A value.

In (Expression 8), when the A value is low, the second term on the right side of (Expression 8) becomes high, and thus the R1 value is apt to become high. For example, when the A value is "0 (zero)", the R1 value becomes "255", which is the maximum value, regardless of the size of the R2 value. Accordingly, when the R1 value in the original image data is low, unless the A value is made high, to put it in other words, the second term on the right side is made low, and the medium color is made difficult to be seen, the R value of when the converted image data is overlapped with the medium M becomes higher than the R1 value of the original image data. Accordingly, the lower the R1 value, the higher the A value is necessary to become.

Next, a description will be given of a relationship between the G value and the B value, which are different colors from the medium color, and the A value.

In (Expression 9), the G1 value is a value produced by multiplying the product of the G2 value and the A value by a constant (1/255), and thus there are a plurality of combinations of the G2 value and the A value in order to produce the predetermined G1 value. However, assuming that the G2 value is an upper limit value of "255", it is easy to make the A value low. Then when G2 is regarded as a constant which is the upper limit value, "255", the A value is nearly proportional to the G1 value. Accordingly, when the R1 value is high, unless the A value is increased so that the medium color is not seen through, the G value of when the converted image is overlapped with the medium M becomes less than the G1 value of the original image. Accordingly, the higher the G1 value, the higher the A value needs to become. In the same manner, the higher the B1 value, the higher the A value needs to become.

Then the lower the R1 value, and the higher the G1 value and the B1 value, the higher the A value needs to become, and thus it is possible to obtain the following expression.

$$A = \max(255 - R1, G1, B1) \quad \text{(Expression 11)}$$

In this manner, by (Expression 8) to (Expression 11), the RGBA values (R2, G2, B2, A) of the converted image data are uniquely determined in accordance with the RGB values (R1, G1, B1) of the pixels included in the original image data. Accordingly, it is possible to convert the RGB-format image data into the RGBA-format image data in accordance with the medium color.

Then as illustrated in FIG. 12, the first conversion table (first look-up table) that converts the RGB values of the pixels included in the original image data into the RGBA values is generated on the basis of (Expression 8) to (Expression 11) in the same manner as the first embodiment.

Here, with the first conversion table illustrated in FIG. 12, the R2 value in the converted image data is less than or equal to the R1 value in the original image data. Accordingly, with the first conversion table, the red grayscale value becomes low by the conversion, and thus the color component of red, which is the medium color, decreases. Further, when the A value is "255−R1", the larger the amount of decrease (R1−R2), which is the difference between the RGB values in the original image data and the R value in the converted image data, the lower the A value becomes.

Next, a description will be given of action of the printer 10 with reference to FIG. 9, FIG. 13, and FIG. 14. More specifically, a description will be given of changes in the RGB values and the CMYKW values when printing an image having gradation from white to black through red onto the medium M having red medium color. In this regard, in FIG. 13 and FIG. 14, the changes in the case of this embodiment are illustrated by solid lines, and the changes in the case of converting the RGB values directly into the CMYKW values without converting the RGB values to the RGBA values are illustrated by broken lines as a comparative example. That is, the image data in the comparative example has a transparency value that is always opaque (A value="255"), and is said to be the original image data in a relationship with the converted image data.

Figure 13:
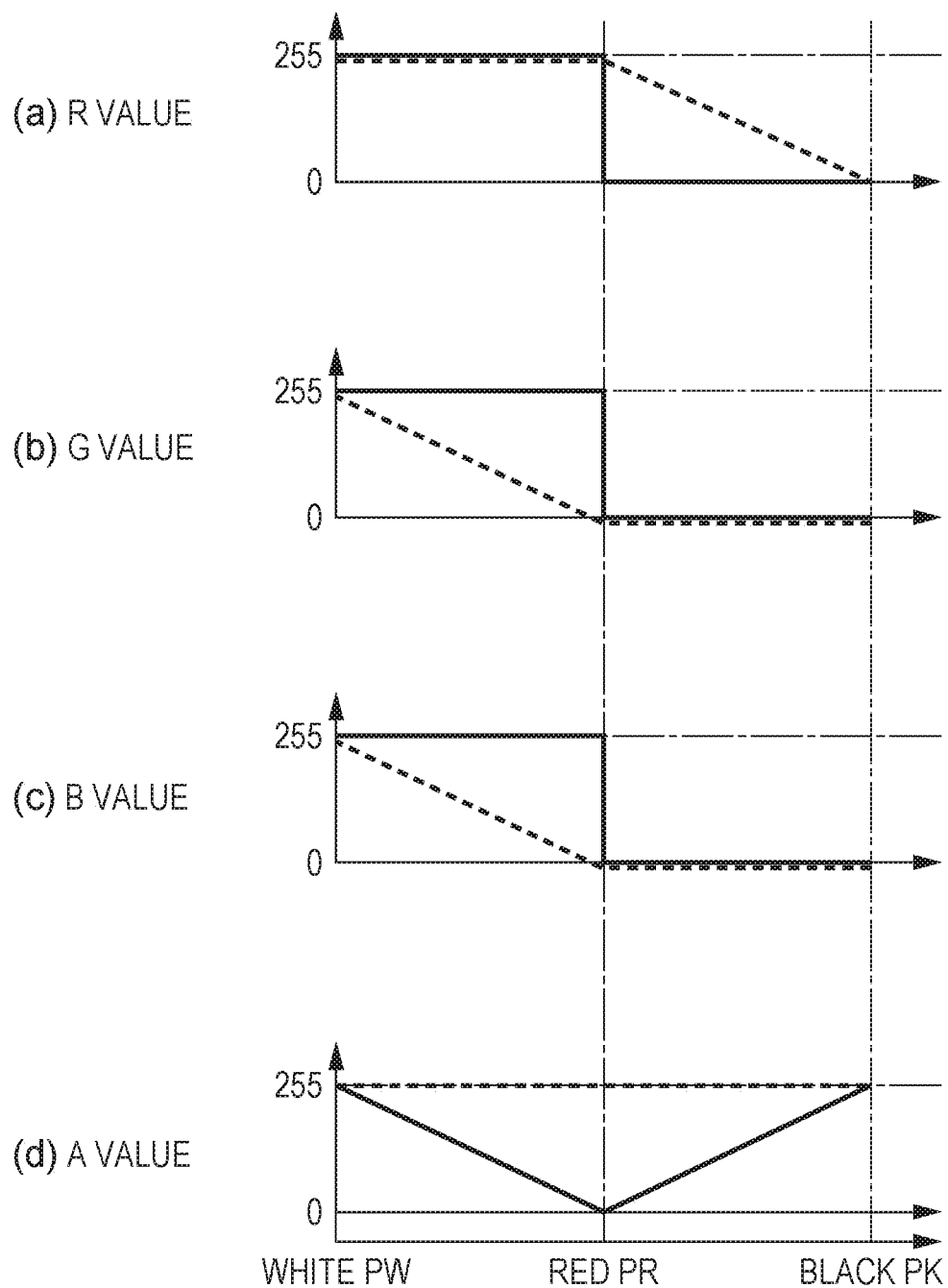
FIG. 13 is a graph illustrating changes in RGBA values with respect to a change in gradation.

As illustrated in FIG. 9, when an image having the gradation from white PW to black PK through red PR is printed, as illustrated in FIG. 13, the RGBA values change in the gradation forming direction (horizontal axis).

In the case of the comparative example, which has the original image data, the RGB values change in the same manner as the case illustrated in FIG. 10. In contrast, in the case of this embodiment, the R value, the G value, and the B value are kept at "255" in a section from white PW to red PR, whereas the A value gradually decreases from "255" to "0 (zero)" when the gradation changes from white PW to red PR. That is, when the gradation changes from white PW to red PR, the A value is gradually decreased in a state in which the RGB values are kept at (255, 255, 255) so that the medium color, which is red, gradually becomes transparent.

Then from red PR to black PK, the R value, the G value, and the B value are kept at "0 (zero)", whereas the A value is gradually increased from "0 (zero)" to "255" as the gradation changes from red PR to black PK. Also, the A value gradually decrease from "255" to "0 (zero)" when the gradation changes from red PR to black PK. That is, the medium color, which is red, gradually becomes not transparent when the gradation changes from red PR to black PK in a state in which the RGB values are kept at (0, 0, 0).

Figure 14:
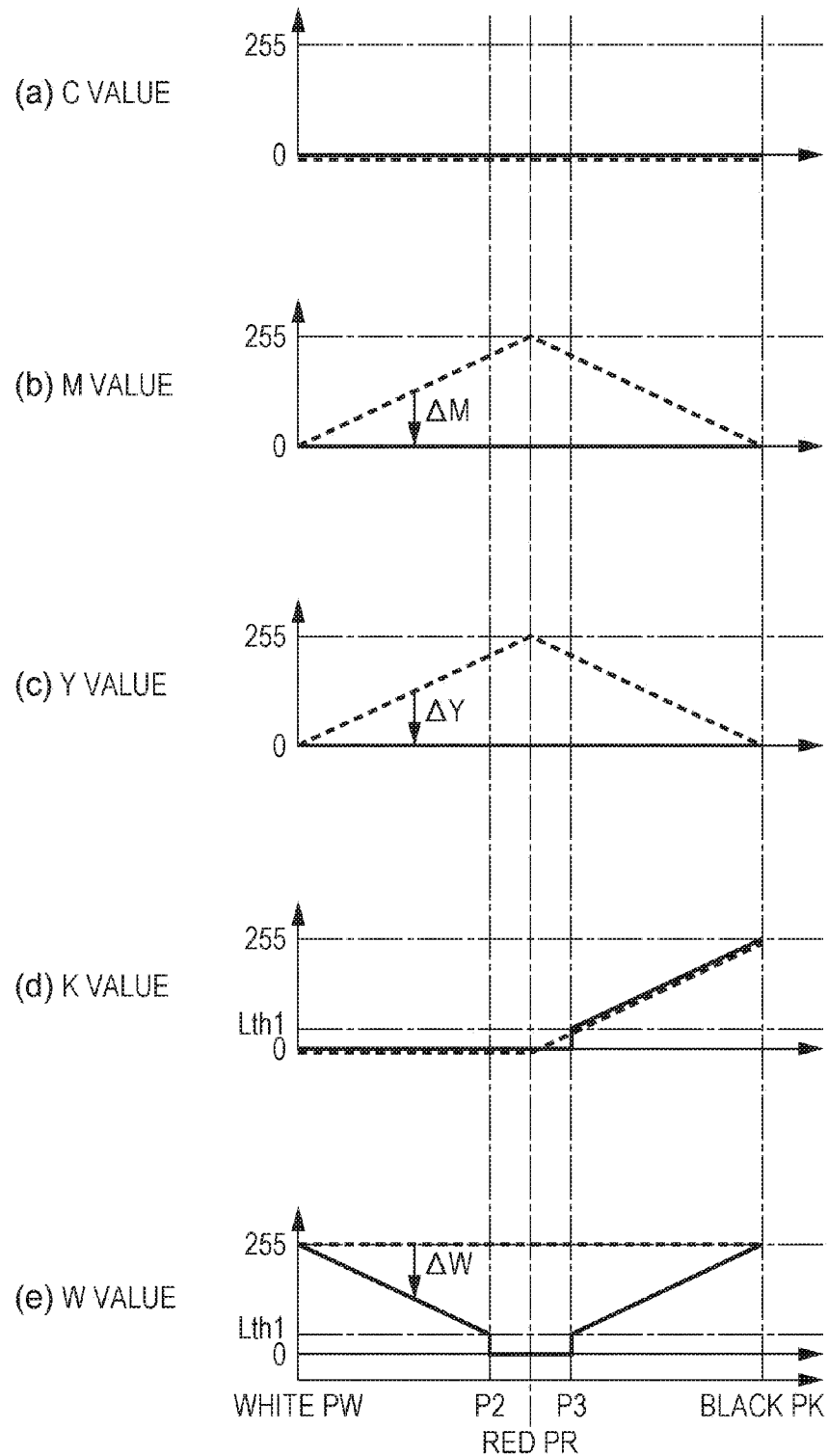
FIG. 14 is a graph illustrating changes in CMYKW values with respect to a change in gradation.

Then as illustrated in FIG. 9, when an image having the gradation from white PW to black PK through red PR is printed, the CMYKW values changes as illustrated in FIG. 14 with respect to the gradation forming direction (horizontal axis). Here, the CMYKW values are the grayscale values corresponding to the amount of ink used, and thus the lower the CMYKW values, the smaller amount of ink is necessary to be used in order to print an image.

In the case of the comparative example, the CMYKW values change in the same manner as in the case illustrated in FIG. 11. That is, in the case of the comparative example, the amount of each ink to be used is determined by the RGB values of the original image data regardless of the medium color.

In contrast, in the case of this embodiment, the C value, the M value, the Y value, and the K value are kept at "0", whereas the W value gradually decreases from "255" to "0 (zero)" when the gradation changes from white PW to red PR. Here, the W value is assumed to be "0 (zero)" at P2 when the grayscale value becomes the first grayscale value Lth1, and is kept at "0 (zero)" after that.

Then the C value, the M value, and the Y value are kept at "0", whereas the K value and the W value gradually increase from "0" to "255" when the gradation changes from red PR to black PK. Here, the K value and the W value are kept at "0 (zero)" until the P3 when the grayscale value becomes the first grayscale value Lth1, and are increased after that.

In this manner, as illustrated in a part (d) of FIG. 14, the amount of the black ink used is substantially equal in the case of this embodiment and in the case of the comparative example. However, as illustrated in parts (b), (c), and (e) of FIG. 14, the amounts of the magenta ink used, the yellow ink used, and the white ink used become smaller in the case of this embodiment than in the case of the comparative example. Accordingly, with this embodiment, the amount of magenta ink used, which is the same as the medium color of the medium M on which printing is performed, and the amount of yellow ink used, and the amount of the white ink used for forming the undercoat are reduced.

Here, as illustrated in parts (b), (c), and (e) of FIG. 14, the difference when the amount of magenta ink used in this embodiment is subtracted from the amount of magenta ink used in the comparative example is assumed to be "the amount of decrease ΔM in magenta ink". Also, the difference when the amount of yellow ink used in this embodiment is subtracted from the amount of yellow ink used in the comparative example is assumed to be "the amount of decrease ΔY in yellow ink", and the difference when the amount of white ink used in this embodiment is subtracted from the amount of white ink used in the comparative example is assumed to be "the amount of decrease ΔW in white ink".

Then, from white PW to black PK, there is a case where the amount of decrease ΔM in magenta ink, and the amount of decrease ΔY in yellow ink become "0 (zero)" or more, and thus the amounts (M value and Y value) of ink to be used corresponding to the medium color (red) in this embodiment are less than the amounts (M value and Y value) of ink to be used corresponding to the medium color (red) in the comparative example.

Also, the amount of decrease ΔM in magenta ink and the amount of decrease ΔY in yellow ink become maximum in the case of red PR. On this point, the amounts of decrease (ΔM and ΔY) in ink use corresponding to the medium color (red) becomes maximum at the time of printing the medium color (red)

Further, the amount of decrease ΔM in magenta ink and the amount of decrease ΔY in yellow ink gradually increase when the gradation changes from white PW to red PR. That is, the amount of decrease ΔM in magenta ink and the amount of decrease ΔY in yellow ink become larger when color similar to the medium color (red) is printed. For example, in the RGB cube illustrated in FIG. 9, when printing a color in the shorter distance from red PR, the larger becomes the amount of decrease ΔM in magenta ink and the amount of decrease ΔY in yellow ink. On this point, the amounts (C value and Y value) of ink to be used are reduced in accordance with a change in color density on the basis of the medium color (red).

On the other hand, the amount of decrease ΔW of white ink becomes larger as the amount of decrease ΔM in magenta ink and the amount of decrease ΔY in yellow ink become larger.

Also, as illustrated in parts (d) and (e) of FIG. 14 in this embodiment, when the W value becomes less than the first grayscale value Lth1, the K value and the W value are corrected to "0 (zero)", and thus black ink, and white ink become unused (undischarged). Accordingly, black ink and white ink become unused for printing a part that is poorly colored among the image printed on the medium M. Also, a pixel having low K and W values becomes not printed, and thus the contrast of the printed image becomes high.

With the embodiments described above, it is possible to obtain the advantages (1) to (6) of the first embodiment.

In this regard, the above-described embodiments may be changed as illustrated below.

The amount of white ink to be used and the amount of image forming ink to be used may not be corrected on the basis of the map illustrated in FIG. 7. In this case, when the amount of white ink to be used is small in each pixel included in the print data, the amount of image forming ink to be used may be increased so that a ratio of the amount of image forming ink used to the amount of white ink used increases compared with when the amount of white ink used is large. That is, when the grayscale value (W value) of white ink is low in the pixels included in the print data, the grayscale value of image forming ink may be high so that the ratio (for example, C value/W value) of the grayscale values (C value, M value, Y value, and K value) of image forming ink to the grayscale value of white ink becomes high in comparison with the case where the grayscale value of white ink is high.

Next, a description will be given of a map for increasing the above-described ratio with reference to FIG. 15.

Figure 15:
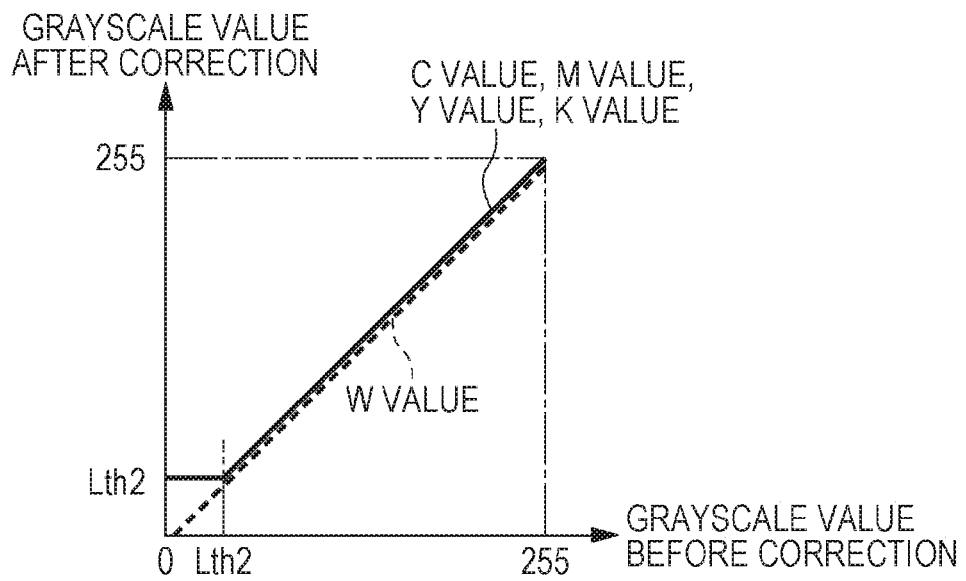
FIG. 15 is a map for correcting the amounts of white ink and image forming ink in a first variation.

The map illustrated in FIG. 15 is a map for not correcting the grayscale value (W value) of the white ink, but correcting the grayscale value (C value, M value, Y value, and K value) of image forming ink. That is, when the grayscale value of image forming ink before the correction is equal to or more than the second grayscale value Lth2, the grayscale value of image forming ink after the correction is set equal to the original grayscale value. Also, when the grayscale value of image forming ink before the correction is less than the second grayscale value Lth2, the grayscale value of image forming ink after the correction is set equal to the second grayscale value Lth2. In this manner, with the map illustrated in FIG. 15, when the grayscale value of white ink is less than the second grayscale value Lth2, the grayscale value of image forming ink is corrected to become high such that the ratio of the grayscale value of image forming ink to the grayscale value of white ink increases compared with the case where the grayscale value of white ink is not less than the second grayscale value Lth2. In this regard, the second grayscale value Lth2 ought to be equal to the first grayscale value Lth1, for example.

Figure 16:
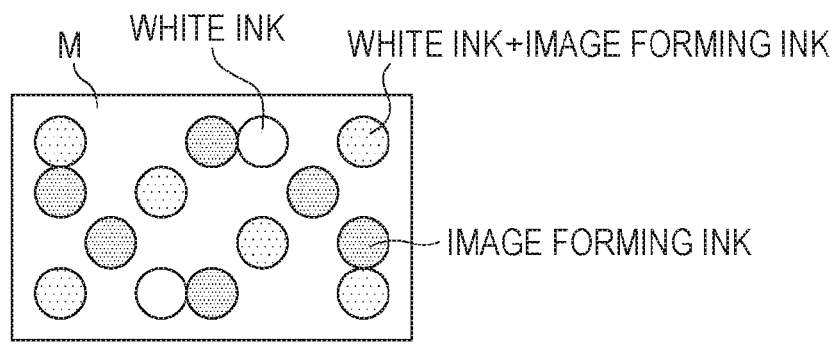
FIG. 16 is a schematic diagram illustrating landing positions of white ink and image forming ink on the printing surface of a medium when printing is performed on the basis of print data having been corrected by the map in the first variation.

Then the grayscale value of image forming ink is corrected using the map illustrated in FIG. 15 so that when a pixel having small amounts of white ink and image forming ink is printed, a large amount of image forming ink is used. Accordingly, as illustrated in FIG. 16, even if an area on which an undercoat is formed is small, image forming ink becomes easy to impact on the undercoat, whereas an undercoat portion on which image forming ink does not impact becomes difficult to remain. Accordingly, it is possible to prevent a poorly colored pixel from being printed on the medium M.

Also, when the amount of white ink to be used in each pixel included in the print data is small, the amount of undercoating ink to be used may be increased such that the ratio of the amount of image forming ink to be used to the amount of white ink to be used becomes low compared with the case where the amount of white ink used is large. That is, when the grayscale value (W value) of white ink in a pixel included in the print data is low, the grayscale value of white ink may be increased so that the ratio (for example, C value/W value) of the grayscale value (C value, M value, Y value, and K value) of image forming ink to the grayscale value of white ink becomes low compared with the case where the grayscale value of white ink is high.

Next, a description will be given of a map for decreasing the above-described ratio with reference to FIG. 17.

Figure 17:
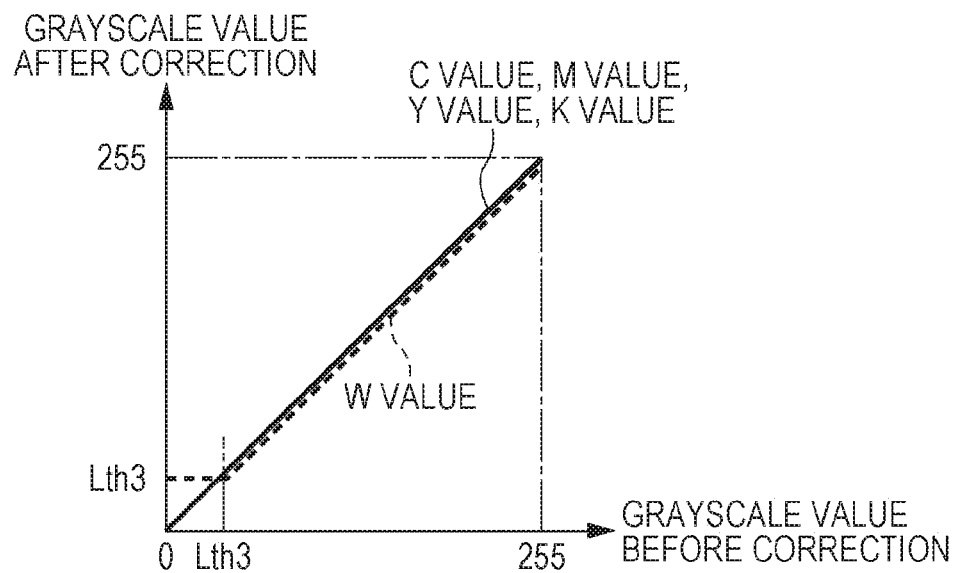
FIG. 17 is a map for correcting the amounts of white ink to be used and image forming ink to be used in a second variation.

The map illustrated in FIG. 17 is a map for correcting the grayscale value (W value) of the white ink, but not correcting the grayscale value (C value, M value, Y value, and K value) of image forming ink. That is, when the grayscale value of image forming ink before the correction is equal to or more than the third grayscale value Lth3, the grayscale value of image forming ink after the correction is set equal to the original grayscale value. Also, when the grayscale value of image forming ink before the correction is less than the third grayscale value Lth3, the grayscale value of image forming ink after the correction is set equal to the third grayscale value Lth3. In this manner, with the map illustrated in FIG. 17, when the grayscale value of white ink is less than the third grayscale value Lth3, the grayscale value of image forming ink is corrected to become high such that the ratio of the grayscale value of image forming ink to the grayscale value of white ink decreases compared with the case where the grayscale value of white ink is not less than the third grayscale value Lth3. In this regard, the third grayscale value Lth3 ought to be equal to the first grayscale value Lth1, for example.

Figure 18:
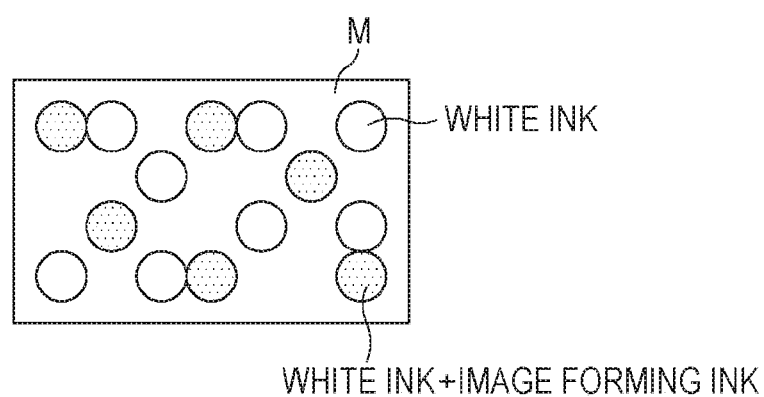
FIG. 18 is a schematic diagram illustrating landing positions of white ink and image forming ink on the printing surface of a medium when printing is performed on the basis of print data having been corrected by the map in the second variation.

Then the grayscale value of white ink is corrected using the map illustrated in FIG. 17 so that when a pixel having small amounts of white ink and image forming ink is printed, a large amount of white ink is used. Accordingly, as illustrated in FIG. 18, an area on which an undercoat is formed becomes large, and thus image forming ink becomes easy to impact on the undercoat, whereas image forming ink becomes difficult to be impacted on the medium M. Accordingly, it is possible to prevent a poorly colored pixel from being printed on the medium M.

The higher the brightness of a medium color, the easier the image forming ink becomes good in color when impacted on the medium M. Accordingly, in the map illustrated in FIG. 7, the first grayscale value Lth1 may be set to low as the brightness of the medium color increases. Thereby, the first grayscale value Lth1 is changed in accordance with the medium color, and thus it is possible to prevent a pixel that has to be good in color from not being printed, or a poorly colored pixel from being printed. In this regard, this is the same for the second grayscale value Lth2 illustrated in FIG. 15.

In the map illustrated in FIG. 15, the second grayscale value Lth2 may have a different value for each color of image forming ink.

In the maps illustrated in FIG. 7, FIG. 15, and FIG. 17, the grayscale values before and after the correction may be changed in stages, or may be changed in a curve.

In the map illustrated in FIG. 7, the first grayscale value Lth1 for white ink may be set to a different vale from the first grayscale value Lth1 for image forming ink. For example, the first grayscale value Lth1 for white ink may be higher than the first grayscale value Lth1 for image forming ink.

In the map illustrated in FIG. 15, when the grayscale value of image forming ink before the correction is "0 (zero)", the grayscale value of image forming ink after the correction may be set to "0 (zero)". Also, in the map illustrated in FIG. 17, when the grayscale value of white ink before the correction is "0 (zero)", the grayscale value of white color after the correction may be set to "0 (zero)".

The map illustrated in FIG. 7 and the map illustrated in FIG. 15 may be used in combination. In this case, it is desirable that the first grayscale value Lth1 is lower than the second grayscale value Lth2. Also, the map illustrated in FIG. 7 and the map illustrated in FIG. 17 may be used in combination. In this case, it is desirable that the first grayscale value Lth1 is lower than the third grayscale value Lth3.

The white ink as an example of undercoating ink may be any other ink as long as having a shielding property, for example, metallic ink.

The processing (subtraction processing) for converting an RGB-format image into an RGBA-format image in accordance with the medium color may not be performed.

When CMYKW-format print data is generated on the basis of RGBA-format image data, the amount of white ink to be used may not be reduced in accordance with the transparency (A value) of pixels included in the RGBA-format image data. For example, the amount of white ink to be used may be constant regardless of the transparency (A value) of the pixels included in the RGBA-format image data.

The ratio of the amount of white ink to be used, as an example of undercoating ink, to the amount of image forming ink to be used may be "1:1", or "2:1". Also, the ratio of the amount of white ink to be used to the amount of image forming ink to be used may be varied in accordance with the amount of image forming ink.

The color information of the medium color may only be subtracted from the color information of the pixels included in the original image data without setting the transparency. In this case, in a state in which an image is printed on the medium, the amount of color information subtracted from the image data is compensated with the color information of the medium color of the medium on which the image is printed so that it is possible to prevent a visual discrepancy from the original image.

The medium color may be green (0, 255, 0), or blue (0, 0, 255), or the other color. In this case, it is desirable to convert the RGB-format image data into the RGBA-format image data on the basis of the expression obtained by assigning the RGB values (R3, G3, B3) of the medium color to (Expression 1) to (Expression 3), and the expression for obtaining a suitable A value.

The medium color may be a color specified by a user of the printer 10 regardless of the printing surface of the medium. In this case, it becomes possible to reduce the amount of image forming ink used for printing the color specified by the user.

The amount of white ink to be used and the amount of image forming ink to be used may not be corrected with reference to the map illustrated in FIG. 7. That is, the processing of step S14 may be omitted in the flowchart illustrated in FIG. 8.

A device other than the printer 10 may perform generating print data on the basis of the original image data. For example, the PC 100 may perform the processing. In this regard, in this case, the PC 100 corresponds to an example of the "print data generation device", the "processing section", and the "generation section".

The medium color may be input by a user of the printer 10 through the operation section 40.

In the above-described embodiment, the description has been given of printing an RGB-format image. However, the present disclosure may be applied to the case of printing an image in the other formats. Examples in the other formats include the CMY format, the CMYK format, the HSV format, the HLS format, the YCbCr format, and the like.

The material of the medium M may be resin, may be metal, fabric, or paper.

The printer 10 may not be an ink jet printer as long as it is a printer that performs printing such that an image formed using image forming ink overlaps an undercoat formed using undercoating ink. For example, the printer 10 may be a sublimation transfer printer, or a solid ink jet printer.

The printer 10 may be a serial printer, a line printer, or a page printer.

The entire disclosure of Japanese Patent Application No. 2014-255241, filed Dec. 17, 2014, is expressly incorporated by reference herein.

What is claimed is:

1. A print processor that generates print data used for printing on a medium on the basis of image data, the print processor comprising:
   a memory that stores the image data and print data that is generated; and
   a controller configured to generate print data specifying an amount of image forming ink to be used for forming an image, and an amount of undercoating ink to be used for forming an undercoat for each pixel on the basis of color information of pixels included in the image data, the controller being configured to maintain a ratio of the amount of the image forming ink to be used to the amount of the undercoating ink to be used constant when the grayscale of the undercoating ink and the grayscale value of the image forming ink are greater than or equal to a threshold grayscale value, in which case both the undercoating ink and the imaging forming ink are printed on the medium, the controller being further configured to perform correction of a grayscale value of the image forming ink and a grayscale value of the undercoating ink when the grayscale value of the undercoating ink and the grayscale value of the image forming ink are less than the threshold grayscale value, wherein, when the grayscale value of the undercoating ink and the grayscale value of the image forming ink are less than the threshold grayscale value, the grayscale value of the undercoating ink and the grayscale value of the image forming ink are corrected to be 0 and neither the undercoating ink nor the image forming ink is printed on the medium.

2. The print processor according to claim 1,
wherein when the amount of undercoating ink to be used is less than a first threshold amount for each pixel included in the print data, the controller increases the amount of image forming ink to be used so as to increase a ratio of the amount of image forming ink to be used to the amount of undercoating ink to be used compared with the ratio of when the amount of undercoating ink to be used is greater than a second threshold amount, which is greater than the first threshold amount.

3. The print processor according to claim 1,
wherein when the amount of undercoating ink to be used is less than a first threshold amount for each pixel included in the print data, the controller increases the amount of undercoating ink to be used so as to decrease a ratio of the amount of image forming ink to be used to the amount of undercoating ink to be used compared with the ratio of when the amount of undercoating ink to be used is greater than a second threshold amount, which is greater than the first threshold amount.

4. The print processor according to claim 1,
wherein the undercoating ink is a white ink or a metallic ink.

5. A printer comprising:
the print processor according to claim 1, and
a print head and carriage assembly configured to perform printing on the medium on the basis of the print data.

6. A printer comprising:
the print processor according to claim 2, and
a print head and carriage assembly configured to perform printing on the medium on the basis of the print data.

7. A printer comprising:
the print processor according to claim 3, and
a print head and carriage assembly configured to perform printing on the medium on the basis of the print data.

8. A printer comprising:
the print processor according to claim 4, and
a print head and carriage assembly configured to perform printing on the medium on the basis of the print data.

* * * * *